United States Patent
Kong et al.

(10) Patent No.: US 7,679,997 B2
(45) Date of Patent: Mar. 16, 2010

(54) METHOD AND APPARATUS FOR ESTIMATING POSITION OF ROBOT

(75) Inventors: Dong-geon Kong, Yongin-si (KR);
Eun-young Choi, Suwon-si (KR);
Hyeon Myeong, Youngin-si (KR);
Yong-beom Lee, Seoul (KR); Seok-won Bang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 283 days.

(21) Appl. No.: 11/808,001

(22) Filed: Jun. 5, 2007

(65) Prior Publication Data

US 2007/0280052 A1    Dec. 6, 2007

(30) Foreign Application Priority Data

Jun. 5, 2006  (KR) ............ 10-2006-0050522
Feb. 22, 2007  (KR) ............ 10-2007-0017902

(51) Int. Cl.
*G01S 3/80* (2006.01)

(52) U.S. Cl. .................................. 367/128

(58) Field of Classification Search ............ 367/128, 367/900, 98
See application file for complete search history.

(56) References Cited

U.S. PATENT DOCUMENTS

2007/0280052 A1*  12/2007  Kong et al. ............ 367/128

FOREIGN PATENT DOCUMENTS

| JP | 59-34372 | 3/1984 |
|---|---|---|
| JP | 59-127186 | 8/1984 |
| JP | 63-266376 | 11/1988 |
| JP | 02-118712 | 5/1990 |
| JP | 09-197044 | 7/1997 |
| JP | 11-2676 | 1/1999 |
| JP | 11-281732 | 10/1999 |
| JP | 2000-029520 | 1/2000 |
| JP | 2002-228736 | 8/2002 |
| JP | 2003-005833 | 1/2003 |
| JP | 2003-330539 | 11/2003 |
| JP | 2005-043337 | 2/2005 |
| JP | 2005-349497 | 12/2005 |
| KR | 10-2002-0049784 | 6/2002 |
| KR | 10-2005-0091367 | 9/2005 |
| KR | 10-2006-0011552 | 2/2006 |
| WO | WO2005/111653 A2 | 11/2005 |

OTHER PUBLICATIONS

Japanese Office Action for corresponding Japanese Patent Application No. 2007-148235 dated Mar. 3, 2009 (3 pgs).
Japanese Office Action for corresponding Japanese Patent Application No. 2007-148235 dated Jun. 16, 2009, 2 pgs.

* cited by examiner

*Primary Examiner*—Dan Pihulic

(57) ABSTRACT

A method and apparatus estimating a position of a moving robot are provided. The method includes receiving a primary signal and a secondary signal transmitted from a predetermined signal transmitter using a sensor, on a moving robot, that receives the primary signal and three or more sensors that receive the secondary signal; calculating a transmission distance from a sensor that receives the secondary signal using time information extracted from the primary signal; and calculating a position of the signal transmitter from the distance, wherein the secondary signal comprises first and second secondary signals and each sensor that senses the secondary signal determines whether to amplify the second secondary signal based on the result of the measurement of the first secondary signal.

30 Claims, 14 Drawing Sheets

FIG. 4
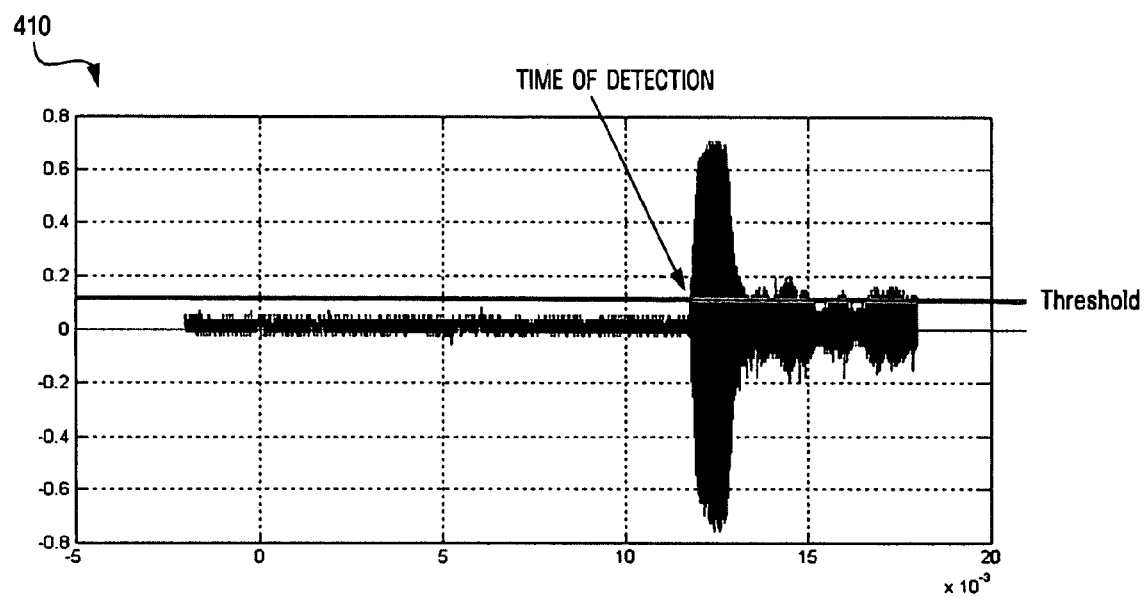
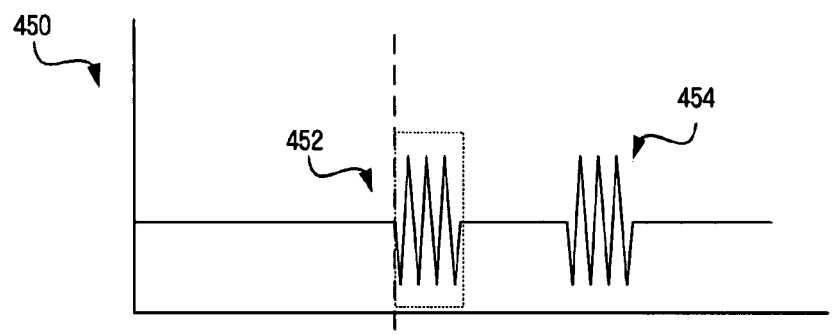

METHOD AND APPARATUS FOR ESTIMATING POSITION OF ROBOT

CROSS-REFERENCE TO RELATED APPLICATIONS

This application is based on and claims priority from Korean Patent Application No. 10-2006-0050522, filed on Jun. 5, 2006 and No. 10-2007-0017902, filed on Feb. 22, 2007 in the Korean Intellectual Property Office, the disclosures of which are incorporated herein their entireties by reference.

BACKGROUND

1. Field

The present invention relates to a method and apparatus estimating a position of a moving robot, and more particularly, to a method and apparatus for estimating a position of a moving robot using generated signals through a signal generator that estimates the position of the robot.

2. Description of the Related Art

Most devices perform their functions at a fixed location. Thus, such devices may not be able to properly perform their functions when they are not fixed. With recent developments in robotics, more public attention has been drawn to moving robots, and research has been vigorously conducted on methods for moving robots.

However, it is difficult for users to precisely indicate a desired location and move robots to the desired location. Conventionally, users must manually move robots or use a remote control device to move the robots.

In the case of moving a robot through remote control, a user can control the robot from a distance. However, it is still difficult to automatically make a robot avoid an obstacle or to move the robot to a desired location by precisely determining the position thereof. Korean Patent Laid-Open Gazette No. 2002-0049784 discloses a method of controlling a cleaning robot through remote control. However, this method needs an additional sensor to make a cleaning robot avoid an obstacle, and involves complicated computation processes. Also, this method is likely to end up failing to properly extract signals, especially when a cleaning robot is blocked by an obstacle.

Therefore, it is necessary to develop methods of precisely detecting signals through remote control in order to precisely determine the position of a robot.

SUMMARY

Accordingly, it is an aspect of the present invention to provide a method and apparatus for improving the accuracy of the estimation of a position of a moving robot by precisely detecting generated signals using a signal generator.

It is another aspect of the present invention to provide a method and apparatus moving a robot exactly to a target location while effectively detecting an obstacle.

Additional aspects and/or advantages will be set forth in part in the description which follows and, in part, will be apparent from the description, or may be learned by practice of the invention.

Accordingly, it is an aspect of the present invention to provide a method of estimating a position of a moving robot, the method including receiving a primary signal and a secondary signal transmitted from a predetermined signal transmitter using a sensor, on the moving robot, that receives the primary signal and a sensor that receives the secondary signal; calculating a transmission distance from the sensor that receives the secondary signal using time information extracted from the primary signal; calculating a position of the signal transmitter from the calculated transmission distance; and measuring the secondary signals; wherein the secondary signal comprises first and second secondary signals and the sensor that senses the secondary signal determines whether to amplify the second secondary signal based on the measuring of the first secondary signal.

According to another aspect of the present invention, there is provided an apparatus estimating a position of a moving robot, the apparatus including a primary signal receiver that receives a primary signal transmitted from a predetermined signal transmitter; a secondary signal receiver that receives a secondary signal transmitted from the signal transmitter; a distance calculation module that calculates a transmission distance of the secondary signal using time information extracted from the primary signal; and a position calculation module that calculates a position of the signal transmitter according to the calculated transmission distance; wherein the secondary signal comprises first and second secondary signals and the distance calculation module comprises an amplification amount determination module that determines whether to amplify the second secondary signal based on a measurement of the first received secondary signal by the secondary signal receiver.

BRIEF DESCRIPTION OF THE DRAWINGS

The above and other features and advantages of the present invention will become more apparent by describing in detail preferred embodiments thereof with reference to the attached drawings in which:

FIG. 4 is a diagram for explaining the reception of a secondary signal according to an embodiment of the present invention;

DETAILED DESCRIPTION OF THE EMBODIMENTS

Figure 1:
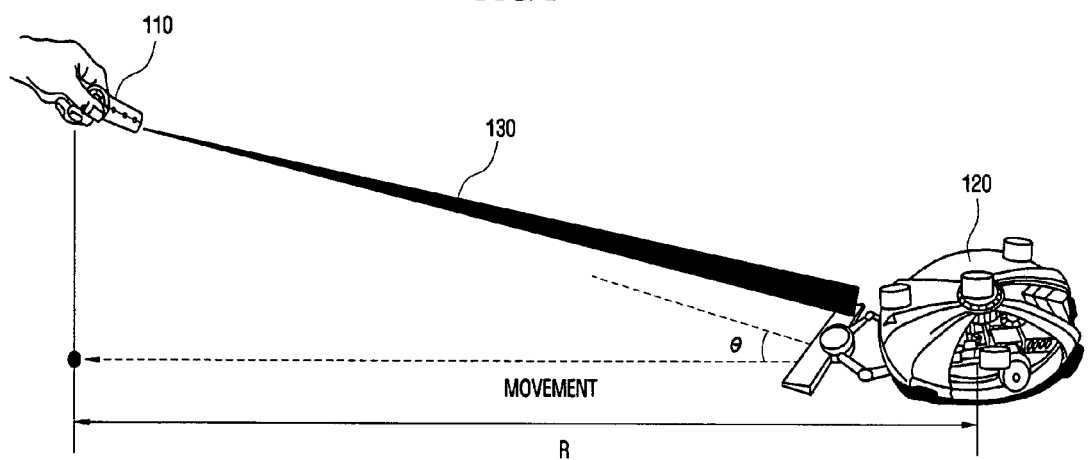
FIG. 1 is a diagram for illustrating an apparatus for moving a robot according to an embodiment of the present invention.

Reference will now be made in detail to the embodiments, examples of which are illustrated in the accompanying drawings, wherein like reference numerals refer to the like elements throughout. The embodiments are described below to explain the present invention by referring to the figures.

Advantages and features of the present invention and methods of accomplishing the same may be understood more readily by reference to the following detailed description of the exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

Hereinafter, embodiments of the present invention will be described in detail with reference to the attached drawings. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

FIG. 1 is a diagram illustrating a configuration according to an embodiment of the present invention. Referring to FIG. 1, a signal generator 110 transmits signals 130 (of two types) to a robot 120. The signal generator 110 may generate signals from fixed locations such as walls, but generally generates the signals from a mobile unit such as a remote control, operated by a user as illustrated in FIG. 1. Hereinafter, the signal generator 110 will be referred to as the remote control 110. The two types of signals are differentiated according to their speeds. For example, radio frequency (RF) signals may be one type of signals transmitted by the remote control device 110, and it generally takes little time to transmit RF signals. Ultrasound signals may be another type of signals transmitted by the remote control device 110. Since it takes relatively more time to transmit ultrasound signals, ultrasound signals can be used for distance measurement (R). Since the remote control device 110 transmits two different types of signals to the robot 120, the robot 120 can determine the location of the remote control device 110 and can thus move to the place where the remote control device 110 is located by moving according to the measured distance (R) and angle (θ) between the robot 120 and the remote control device 110.

Furthermore, the moving robot 120 can store the positions of the remote control 110 with respect to each signal using the remote control device 110 and generating signals from a plurality of positions. The moving robot 120 forms a moving path pattern from the stored positions, and moves along the pattern. For example, in the case of a cleaning robot 120, a user transmits signals on each corner of a to-be-cleaned area using the remote control device 110. The cleaning robot 120 stores positions of each corner calculated by the aforementioned method. The user can execute cleaning operations by forming a cleaning path pattern, and moving the cleaning robot along the cleaning path pattern. The moving path pattern may be formed within a folium that connects positions of a plurality of signal generators. For example, when in the case of carpet cleaning, a user sequentially transmits signals on each corner thereof using a remote control device. In this case, the moving robot calculates the four positions of the remote control device from the signals generated from each position, and stores the four positions. Here, a square-shaped folium may be formed from the four positions, the moving path of the cleaning robot may be formed in a zigzag or spiral pattern within the formed folium. The moving path should be formed in the folium so that the robot can clean the entire surface of the carpet.

Figure 2:
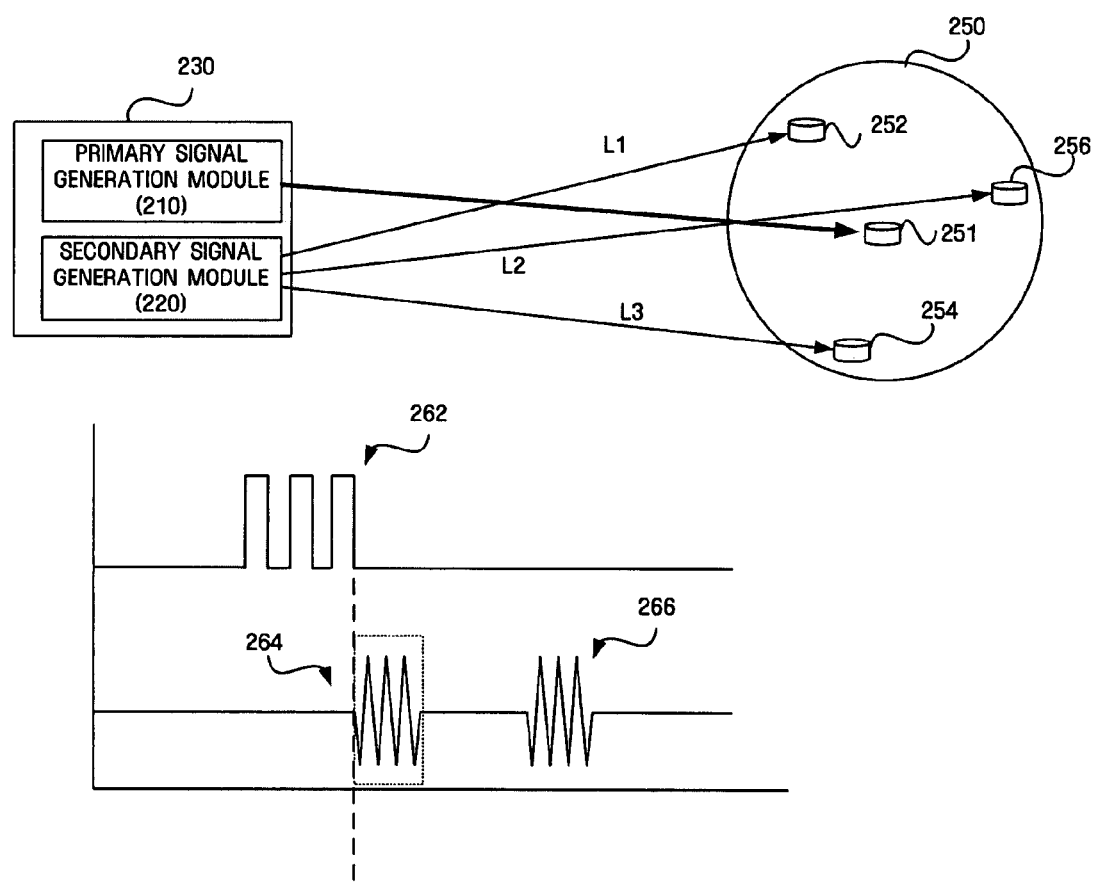
FIG. 2 is a diagram for explaining the movement of a robot according to signals transmitted by a remote control device according to an embodiment of the present invention.

FIG. 2 is a diagram explaining the movement of a robot according to signals transmitted by a remote control device according to an embodiment of the present invention. Referring to FIG. 2, a remote control device 230 (similar to the remote control device 110) generates two types of signals, and transmits the signals to a robot 250. A plurality of sensors 251, 252, 254, and 256 of the robot 250 receive a primary signal 262 generated by a primary signal generation module 210 of the remote control device 230 and secondary signals 264 and 266 generated by a secondary signal generation module 220 of the remote control device 230. For example, assume that the primary signal generation module 210 generates an RF signal or an infrared (IR) signal when the secondary signal generation module 220 generates an ultrasound signal. Due to the characteristics of RF signals or IR signals, the robot 250 can sense a primary signal generated by the primary signal generation module 210 almost as soon as the primary signal generation module 210 transmits the primary signal. However, the robot 250 can sense the secondary signal 264 generated by the secondary signal generation module 220 only a predetermined period of time after the secondary signal generation module 220 transmits the secondary signal 264. Thus, the distance between the remote control device 230 and the robot 250 and the location of the remote control device 230 can be determined based on a difference between the time of reception of the primary signal by the robot 250 and the time of reception of the secondary signal by the robot 250. Referring to FIG. 2, in order to enhance the reception of the secondary signal by the robot 250, the remote control device 230 transmits an ultrasound signal twice, determines whether to amplify the second ultrasound signal and determines the amount by which the second ultrasound signal is to be amplified based on the first ultrasound signal, i.e., an auto gain control (AGC) signal (the signal 264), and senses the second ultrasound signal, i.e., a measurement signal (the signal 266).

The remote control device 230 may transmit an ultrasound signal to the robot 250 twice, as illustrated in FIG. 2. In this case, if the first ultrasound signal 264 is distorted or attenuated while being transmitted to the robot 250, the remote control device 230 may use the first ultrasound signal 264 to determine whether to amplify the second ultrasound signal 266. Also, the remote control device 230 increases accuracy of signal detection by transmitting two different types of signals to the robot 250, and can thus precisely determine the distance between the remote control device 230 and the robot 250. When the secondary signal generated by the secondary signal generation module 220 is received, the robot 250 uses the sensors 252, 254, and 256 to precisely determine the distance between the robot 250 and the remote control device 230. As described above, the time taken to receive a secondary signal generated by the secondary signal generation module 220 can be determined using a primary signal generated by the primary signal generation module 210. As a result, the sensors 252, 254, and 256 can respectively determine distances L1, L2, and L3 to the remote control device 230. The location of the remote control device 230 can be determined using the distances between the sensors 252, 254, and 256 and the distances L1, L2, and L3. According to the present embodiment, three sensors are used to receive a secondary signal from the secondary signal generation module 220. If more sensors are used, the distance measurement will be more precise. However, if more sensors are used, more computations are required. Thus, it can be seen that there is a tradeoff between the precision of distance measurement results and the amount of computation.

According to the present embodiment, three sensors are used to receive a secondary signal generated by the secondary signal generation module 220, and one signal is used to receive a primary signal generated by the primary signal generation module 210. However, the present invention is not restricted to this arrangement. A distance measurement method using more sensors will be described later in detail.

Figure 3:
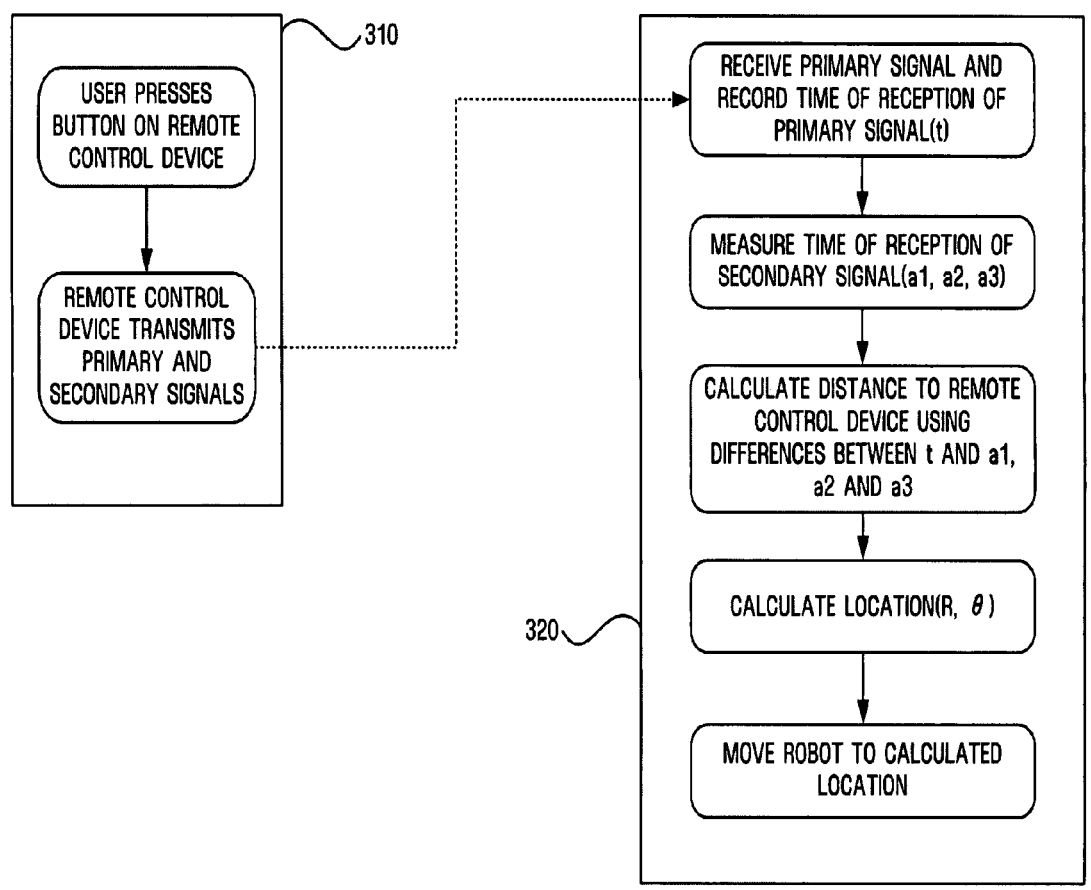
FIG. 3 is a diagram for explaining interactions between a remote control device and a robot according to an embodiment of the present invention.

FIG. 3 is a diagram for explaining interactions between a remote control device 310 and a robot 320 according to another embodiment of the present invention. Referring to FIG. 3, when a user presses a button on the remote control device 310, the remote control device 310 transmits a primary signal and a secondary signal. The remote control device 310 may simultaneously or sequentially transmit the primary and secondary signals. Also, the remote control device 310 may transmit the primary and secondary signals using a method agreed upon between the remote control device 310 and the robot 320 in advance.

The robot 320 receives the primary signal and records a time t of reception of the primary signal. Thereafter, the robot 320 measures the time of reception of the secondary signal. As described above with reference to FIG. 2, a plurality of sensors may receive the same signal at different times. Referring to FIG. 3, three sensors of the robot 320 receive the secondary signal at times a1, a2, and a3, respectively. The distance between the remote control device 310 and the robot 320 can be determined based on the times t, a1, a2, and a3. Then, the position of the robot 320 with respect to the remote control device can be calculated using distance and angle information (R, θ) indicating the position of the remote control device 310.

FIG. 4 is a diagram explaining the reception of a secondary signal according to an embodiment of the present invention. Conventionally, when a signal with amplitude higher than a predefined threshold is generated, a sensor deems the signal to be a new signal, and detects the signal, as illustrated in an upper portion 410. However, if the amplitude of the signal is attenuated below the predefined threshold because of, for example, a change in the distance between a transmitter and a receiver or a change in the direction of the transmitter, the signal may not be detected by a sensor. In order to address this problem, the embodiments of the present invention provide a method to detect low-amplitude signals.

Referring to a lower portion 450 of FIG. 4, according to the present embodiment, a secondary signal is transmitted twice, as described above with reference to FIG. 2. The first secondary signal, i.e., an AGC signal 452, is sensed after the transmission of a primary signal, and the amount by which the second secondary signal, i.e., a measurement signal 454, is to be amplified can be determined based on the AGC signal 452. Thereafter, the measurement signal 454, which is received after the reception of the AGC signal 452, can be detected by amplifying the measurement signal 454 by the determined amount of amplification.

Figure 5:
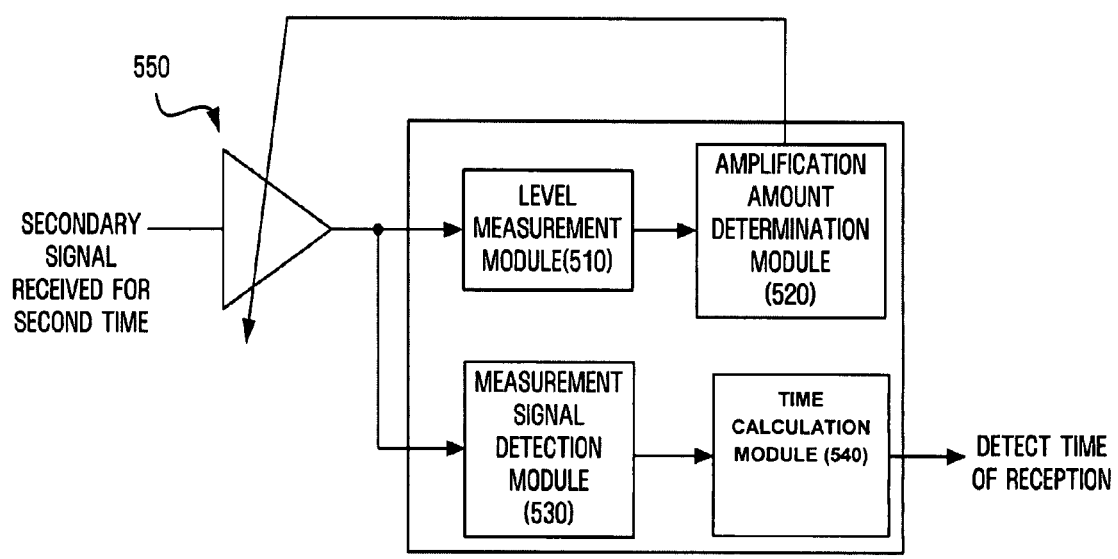
FIG. 5 is a block diagram for explaining the amplification of a secondary signal according to an embodiment of the present invention.

FIG. 5 is a block diagram explaining the amplification of a secondary signal according to another embodiment of the present invention. An amplification mechanism illustrated in FIG. 5 can be realized by the sensors 252, 254, and 256 illustrated in FIG. 2. Referring to FIG. 5, a secondary signal is received by an amplification module 550. An AGC signal is a first secondary signal received by the amplification module 550. A level measurement module 510 determines the amplitude and saturation (whether a threshold has been reached) of the AGC signal. An amplification amount determination module 520 determines the amount by which a measurement signal, which is a second secondary signal received by the amplification module 550, is to be amplified based on the results of the determination performed by the level measurement module 510. The result of the determination performed by the amplification amount determination module 520 is fed back to the amplification module 550.

A predetermined period of time later, the measurement signal is received. Then, the amplification module 550 amplifies the received signal by the determined amount of amplification, and a measurement signal detection module 530 determines whether the amplified signal is a real measurement signal. If the amplified signal is determined to be a real measurement signal, a time calculation module 540 detects the time of reception of the corresponding signal. The result of the detection performed by the time calculation module 540 may be a1, a2, or a3, as described above with reference to FIG. 3. The location of a remote control device can be determined by comparing the times of reception of a measurement signal by a plurality of sensors.

Figure 6:
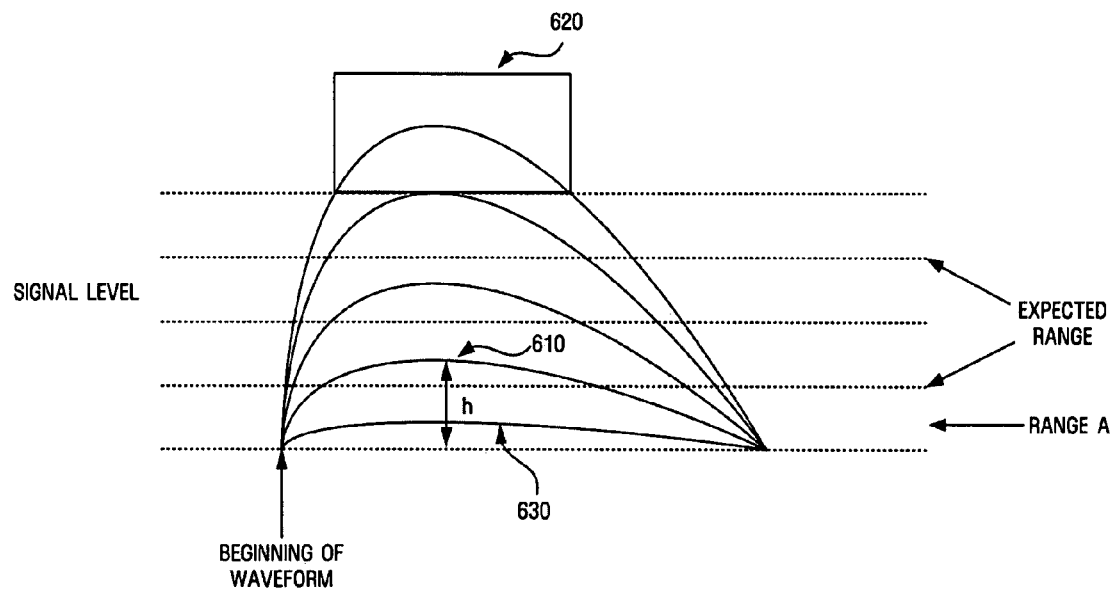
FIG. 6 is a diagram for explaining the determination of whether to amplify a signal according to the level of the signal according to an embodiment of the present invention.

FIG. 6 is a diagram explaining the determination of whether to amplify a signal according to the level of the signal according to an embodiment of the present invention. Specifically, FIG. 6 illustrates the amplification of a signal in which a threshold has not been reached.

A sensed signal falls within one of a plurality of signal level ranges illustrated in FIG. 6. It can be determined to which of the signal level ranges the sensed signal belongs according to the height of an envelope of the sensed signal. A signal that does not reach a threshold range 620 may be adjusted using a voltage level comparator such that the signal can fall within an expected range. The height of an envelope of a signal 630 is low, and thus, the signal 630 does not fall within the expected range. In this case, the signal 630 can be amplified such that the signal 630 can fall within the expected range. For example, signal 610 falls within the expected range, having an amplitude 'h'.

Figure 7:
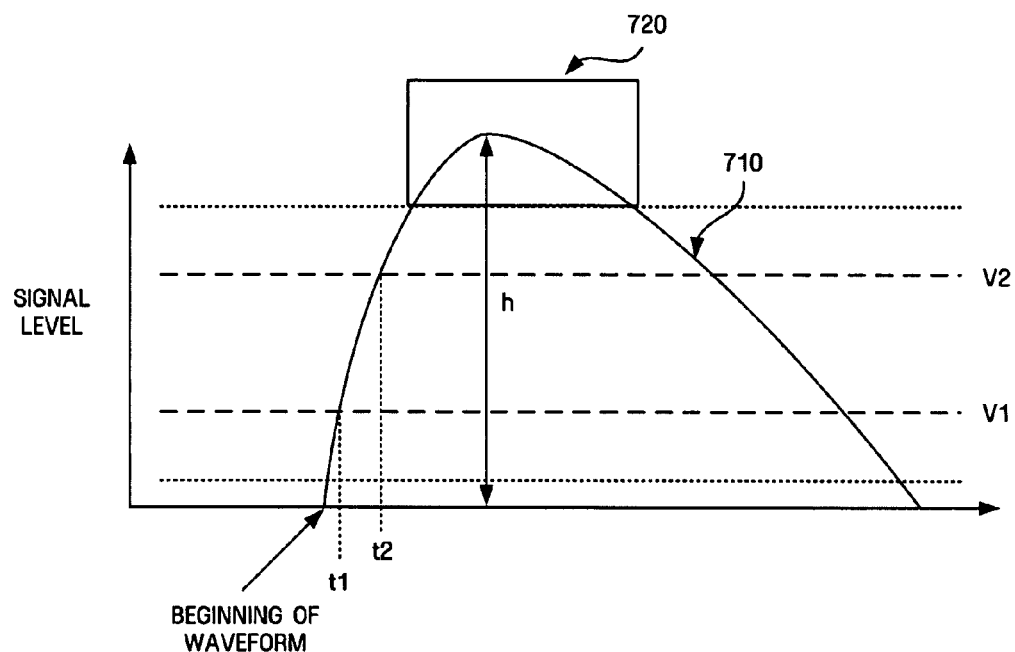
FIG. 7 is a diagram for explaining the detection of a received signal according to an embodiment of the present invention.

FIG. 7 is a diagram explaining the detection of the waveform of a received signal according to an embodiment of the present invention. Specifically, FIG. 7 illustrates the amplification of a signal in which a threshold has been reached.

Referring to FIG. 7, a maximum amplitude h of an input signal 710 is estimated based on a time t1 when the input signal 710 reaches a first voltage V1 and a time when the input signal 710 reaches a second voltage V2. Thereafter, the gain of an amplification module is adjusted using the maximum amplitude h of the input signal 710. For example, the gain of the amplification module may be adjusted by 1/(2 h) (=½*1/h). Element 720 represents a threshold range of the signal.

Figure 8:
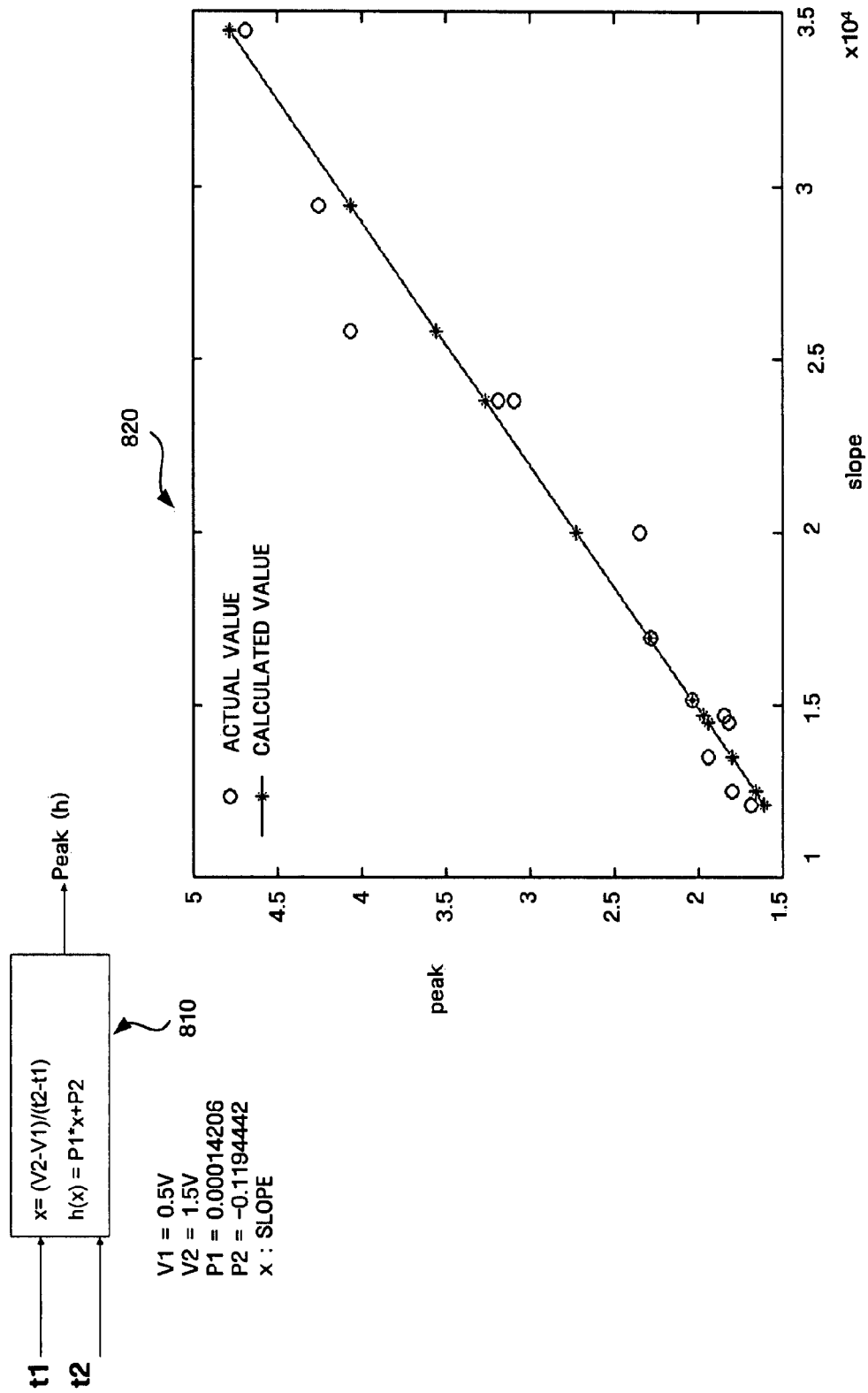
FIG. 8 is a diagram for explaining the estimation of maximum amplitude using times t1 and t2 according to an embodiment of the present invention.

FIG. 8 is a diagram explaining the estimation of the maximum amplitude h using the times t1 and t2 obtained through the operations illustrated in FIGS. 6 and 7.

The relationship between the times t1 and t2 and the maximum amplitude h may be determined experimentally or may be determined using a regression equation, and the results of the determination may be stored. Referring to 810 of FIG. 8, the ratio of a difference between the voltages V1 and V2 and a difference between the times t1 and t2 is calculated, and a predetermined peak amplitude (Peak(h)) can be obtained using the result of the calculation.

In detail, a slope x can be determined using the times t1 and t2, and the voltages V1 and V2. Once the slope x is determined, the peak amplitude Peak(h) can be estimated using the slope x and values of P1 and P2. A graph 820 of FIG. 8 compares estimated peak amplitude values obtained using the aforementioned manner with actual peak amplitude values.

Referring to the graph 820, estimated peak amplitude uniformly increases, and actual peak amplitude increases, but not uniformly, and slightly differs from the estimated peak amplitude. If the estimated peak amplitude considerably deviates from the actual peak amplitude, the values of the coefficients P1 and P2 may be appropriately adjusted.

Once an AGC signal that is received for a first time is measured through the operations illustrated in FIGS. 6 through 8, a measurement signal that is received for a second time needs to be processed.

Figure 9:
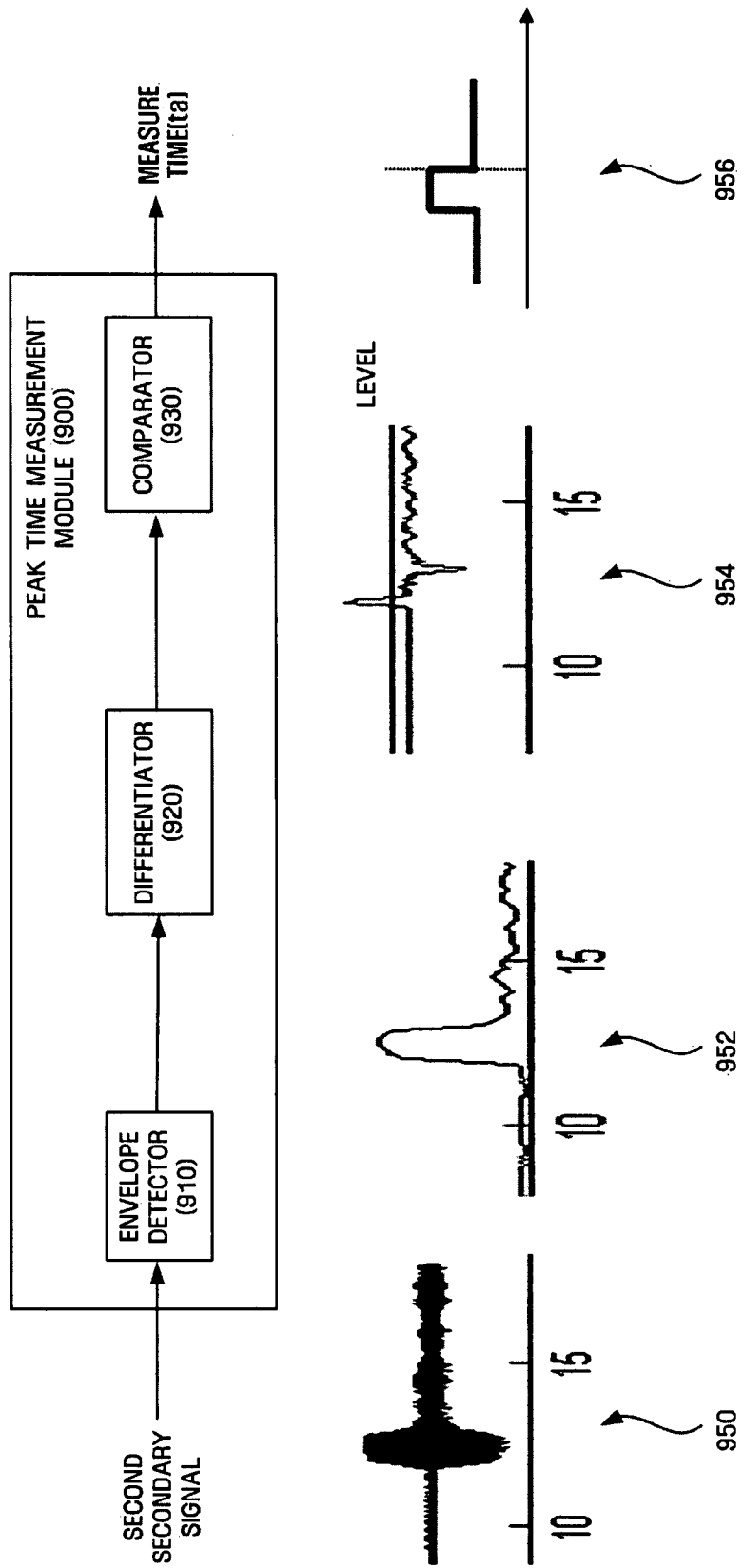
FIG. 9 is a diagram for explaining the measurement of the time of reception of a measurement signal according to an embodiment of the present invention.

FIG. 9 is a diagram for explaining the measurement of the time of reception of a measurement signal 950 according to an embodiment of the present invention. Referring to FIG. 9, when the measurement signal 950 is inputted to a peak time measurement module 900, an envelope detector 910 senses an envelope of the measurement signal 950, thereby providing a waveform 952. The waveform 952 is inputted to a differentiator 920, and the differentiator 920 outputs a differentiated signal having a waveform 954. A comparator 930 compares the differentiated signal with a predetermined level, thereby generating a peak signal 956. Thereafter, a time ta of reception of the peak signal 956 is measured. The location of a remote control device can be determined by comparing the time ta with the time of reception of a primary signal received before the reception of the measurement signal 950. The peak time measurement module 900 may be included in each sensor that receives a secondary signal.

A distance L to a remote control device can be determined through peak time measurement of a measurement signal, which is one of a plurality of secondary signals respectively received by a plurality of sensors. The distance L can be calculated, as indicated by Equation (1)

$$L=v*T(m), v=0.61*(\text{Temperature})+331.5(m/s) \quad (1),$$

where T represents a difference between the time of reception of a primary signal and the time of reception of a secondary signal and "Temperature" means "temperature of the room". The distance L can be determined by substituting the time difference T into Equation (1).

Figure 10:
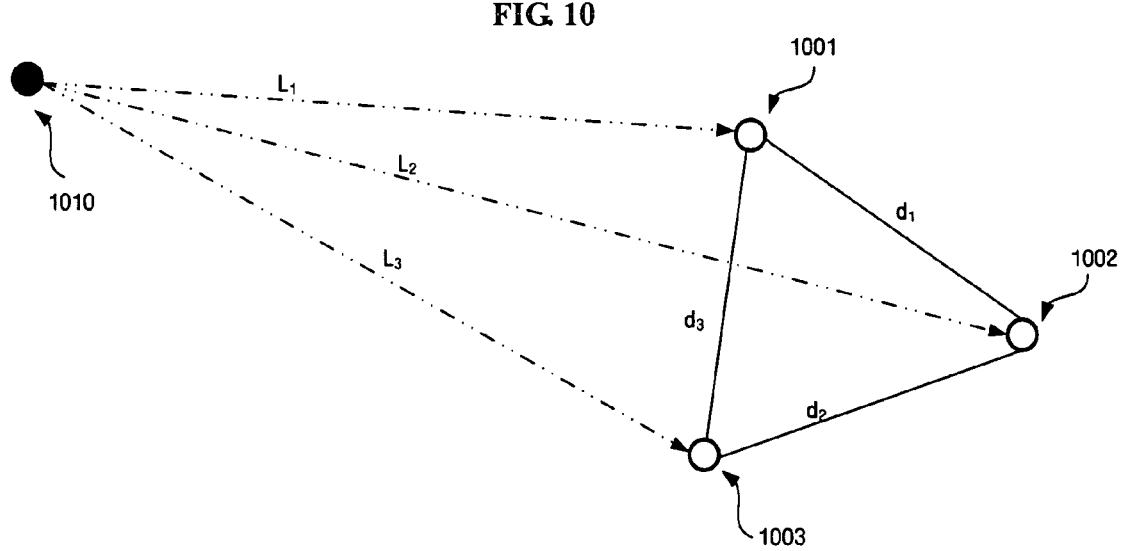
FIG. 10 is a diagram for explaining the determination of the circumstances using distance information provided by a plurality of sensors according to an embodiment of the present invention.

FIG. 10 is a diagram for explaining the determination of the circumstances according to distance information provided by three sensors 1001, 1002, and 1003 according to an embodiment of the present invention. Referring to FIG. 10, a secondary signal transmitted by a remote control device 1010 is received by the sensors 1001, 1002, and 1003, and the location of the remote control device 1010 can be determined using distance information $L_1$, $L_2$, and $L_3$ respectively provided by the sensors 1001, 1002, and 1003. Also, it is possible to determine whether an obstacle exists between the remote control device 1010 and the sensors 1001, 1002, and 1003 using the distance information $L_1$, $L_2$, and $L_3$.

Equations (2), (3), and (4) can be derived from the theorem that the sum of the lengths of two sides of a triangle is greater than the length of the other side of the triangle. However, two sensors may be aligned on the same straight line. Given all this, assume that the sum of the lengths of two sides of a triangle may be greater than or equal to the length of the other side of the triangle, and Equations (2), (3), and (4) are expanded based on this assumption, as follows:

$$L_1 \leq L_2+d_1, |L_1-L_2| \leq d_1 \quad (2)$$

$$|L_1-L_2| \leq d_1+\Delta \quad \text{(First Condition)}$$

$$L_2 \leq L_3+d_2, |L_2-L_3| \leq d_2 \quad (3)$$

$$|L_2-L_3| \leq d_2+\Delta \quad \text{(Second Condition)}$$

$$L_3 \leq L_1+d_3, |L_3-L_1| \leq d_3 \quad (4)$$

$$|L_3-L_1| \leq d_3+\Delta \quad \text{(Third Condition)}.$$

Wherein d1, d2 and d3 represent the distances between the sensors 1001, 1002 and 1003. If current circumstances satisfy all of the first through third conditions respectively indicated by Equations (2), (3), and (4), it is determined that no obstacle exists between the remote control device 1010 and the sensors 1001, 1002, and 1003. If the current circumstances satisfy only one of the first through third conditions, i.e., if the distance between the remote control device 1010 and one of the sensors 1001, 1002, and 1003 is much longer or shorter than the distances between the remote control device 1010 and the other two sensors, the current circumstances may be determined as follows.

Figure 11:
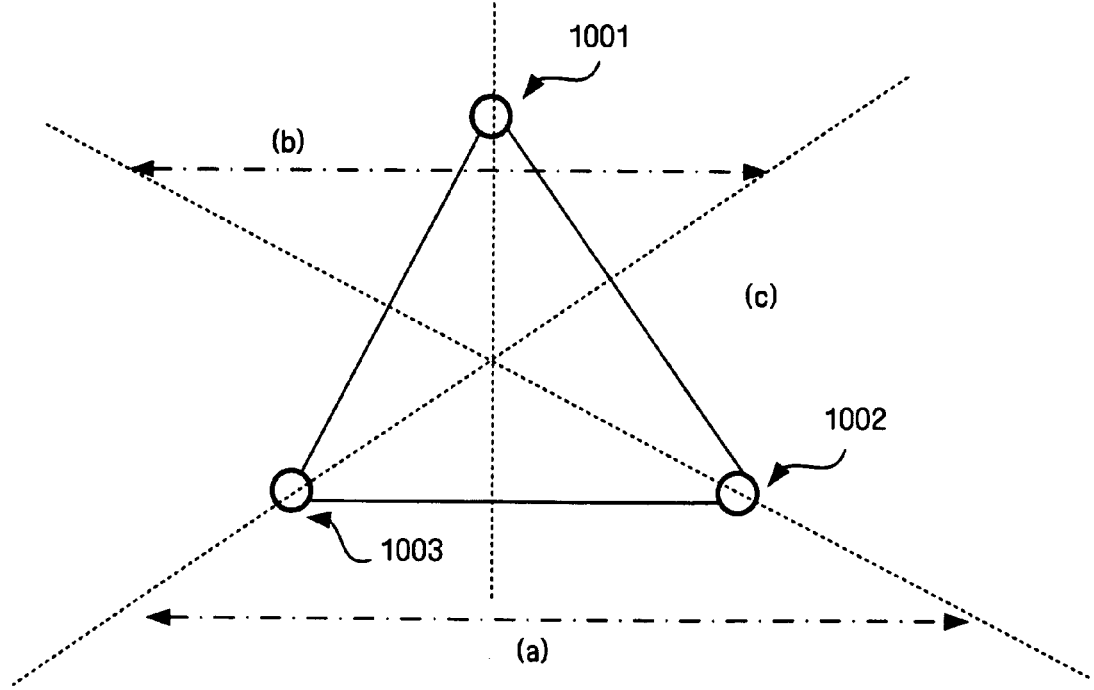
FIG. 11 is a diagram for explaining the division of a region according to the locations of the sensors illustrated in FIG. 10.

FIG. 11 is a diagram explaining the division of a region according to the locations of the sensors 1001, 1002, and 1003 illustrated in FIG. 10.

(1) If the distance between the remote control device 1010 and one of the sensors 1001, 1002, and 1003 is much longer than the distances between the remote control device 1010 and the other two sensors, it may be determined that one of the sensors 1001, 1002, and 1003 is blocked by an obstacle.

For example, assume that the current circumstances satisfy only the second condition and the distance $L_1$ is longer than the distances $L_2$ and $L_3$. If $|L_2-L_3|<\Delta$, it is determined that a transmitter of the remote control device 1010 is located in a region (a). If $L_2 \gg L_3$, it is determined that the transmitter is located in a 0° direction. If $L_2 \ll L_3$, it is determined that the transmitter is located in a 180° direction.

Assume that the current circumstances satisfy only the second condition and the distance $L_1$ is shorter than the distances $L_2$ and $L_3$. If $|L_2-L_3|<\Delta$, it is determined that the transmitter is located in a region (b). Otherwise, the existence of an object may be determined, but the location of the object may not be determined.

(2) If the distance between the remote control device 1010 and one of the sensors 1001, 1002, and 1003 is much shorter than the distances between the remote control device 1010 and the other two sensors, it may be determined that two of the sensors 1001, 1002, and 1003 are blocked by an obstacle.

If the current circumstances satisfy only two of the first through third conditions, the existence of an object may be determined, but the location of the object may not be determined.

Figure 12:
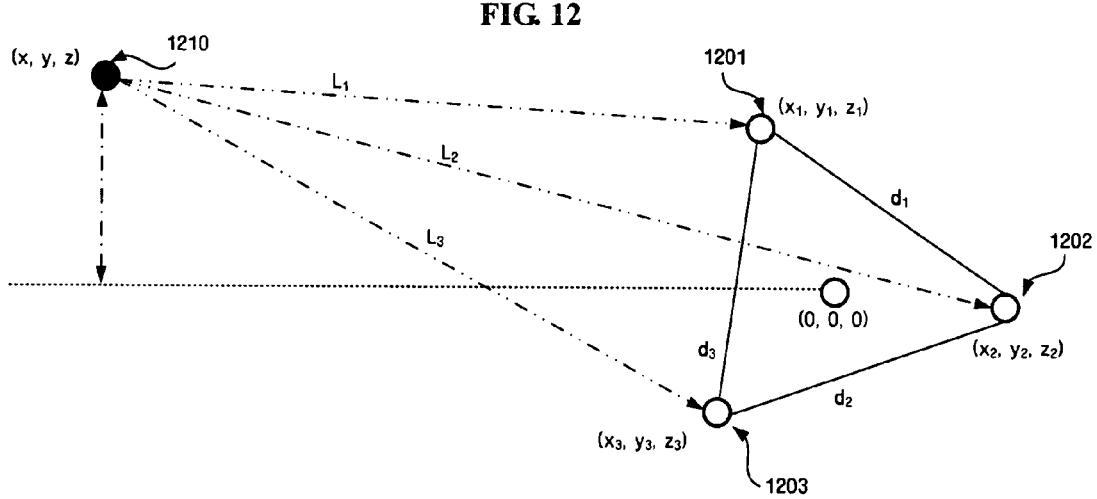
FIG. 12 is a diagram for explaining the determination of the location of a remote control device when no obstacle exists, according to an embodiment of the present invention.

FIG. 12 is a diagram explaining the determination of the location of a remote control device 1210 when no obstacle exists, according to an embodiment of the present invention.

Since location information of each of a plurality of sensors 1201, 1202, and 1203, and distances $L_1$, $L_2$, and $L_3$ are already known, the location of the remote control device 1210 represented by coordinates x, y, and z can be determined, as indicated by Equation (5). The center location of a robot including the sensors 1201, 1202, and 1203 is (0, 0, 0).

$$(x-x_1)^2+(y-y_1)^2+(z-z_1)^2=L_1^2$$

$$(x-x_2)^2+(y-y_2)^2+(z-z_2)^2=L_2^2$$

$$(x-x_3)^2+(y-y_3)^2+(z-z_3)^2=L_3^2 \qquad (5).$$

Thereafter, the location of a user, which is represented by a distance R and an angle θ between the user and the remote control device 1210 and can be determined, as indicated by Equation (6):

$$R=\sqrt{x^2+y^2}$$

$$\theta=\text{atan }2(x,y) \qquad (6)$$

Figure 13:
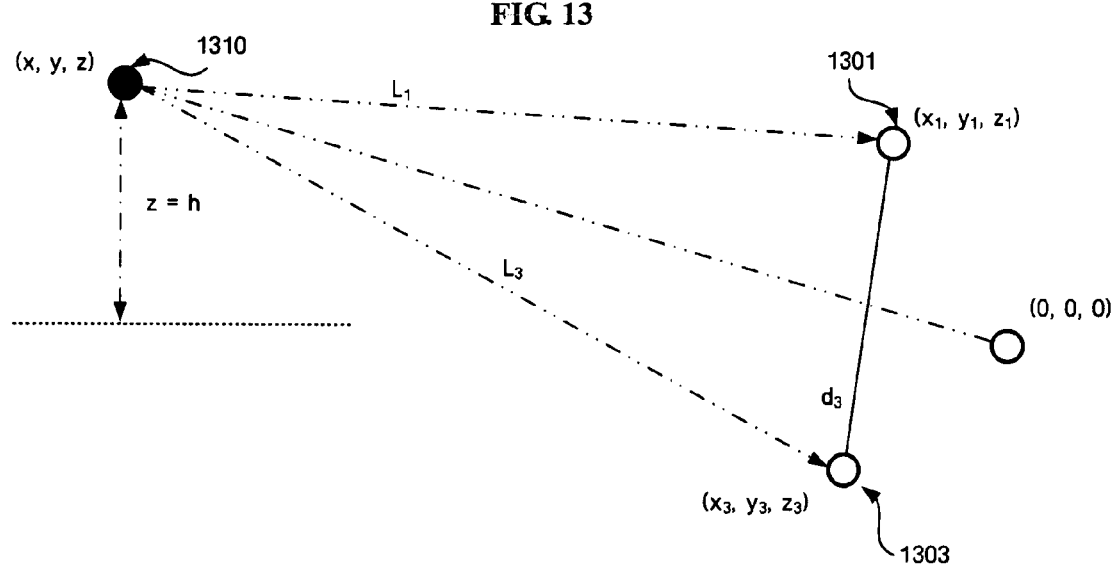
FIG. 13 is a diagram for explaining the determination of the location of a remote control device using two sensors when an obstacle exists, according to an embodiment of the present invention.

FIG. 13 is a diagram explaining the determination of the location of a remote control device 1310 by using two sensors 1301 and 1303 when an obstacle exists, according to another embodiment of the present invention. Specifically, FIG. 13 illustrates the situation when only one of three sensors is blocked by an obstacle.

Since location information of each of the sensors 1301 and 1303, and distances $L_1$ and $L_3$ are already known, the location of the remote control device 1310 represented by coordinates x, y, and z can be determined, as indicated by Equation (7):

$$(x-x_1)^2+(y-y_1)^2+(z-z_1)^2=L_1^2$$

$$(x-x_3)^2+(y-y_3)^2+(z-z_3)^2L=L_3^2 \qquad (7).$$

Thereafter, a 2D distance R and a direction θ can be determined, as indicated by Equation (8):

$$R=\sqrt{x^2y^2}$$

$$\theta=\text{atan }2(x,y) \qquad (8).$$

Figure 14:
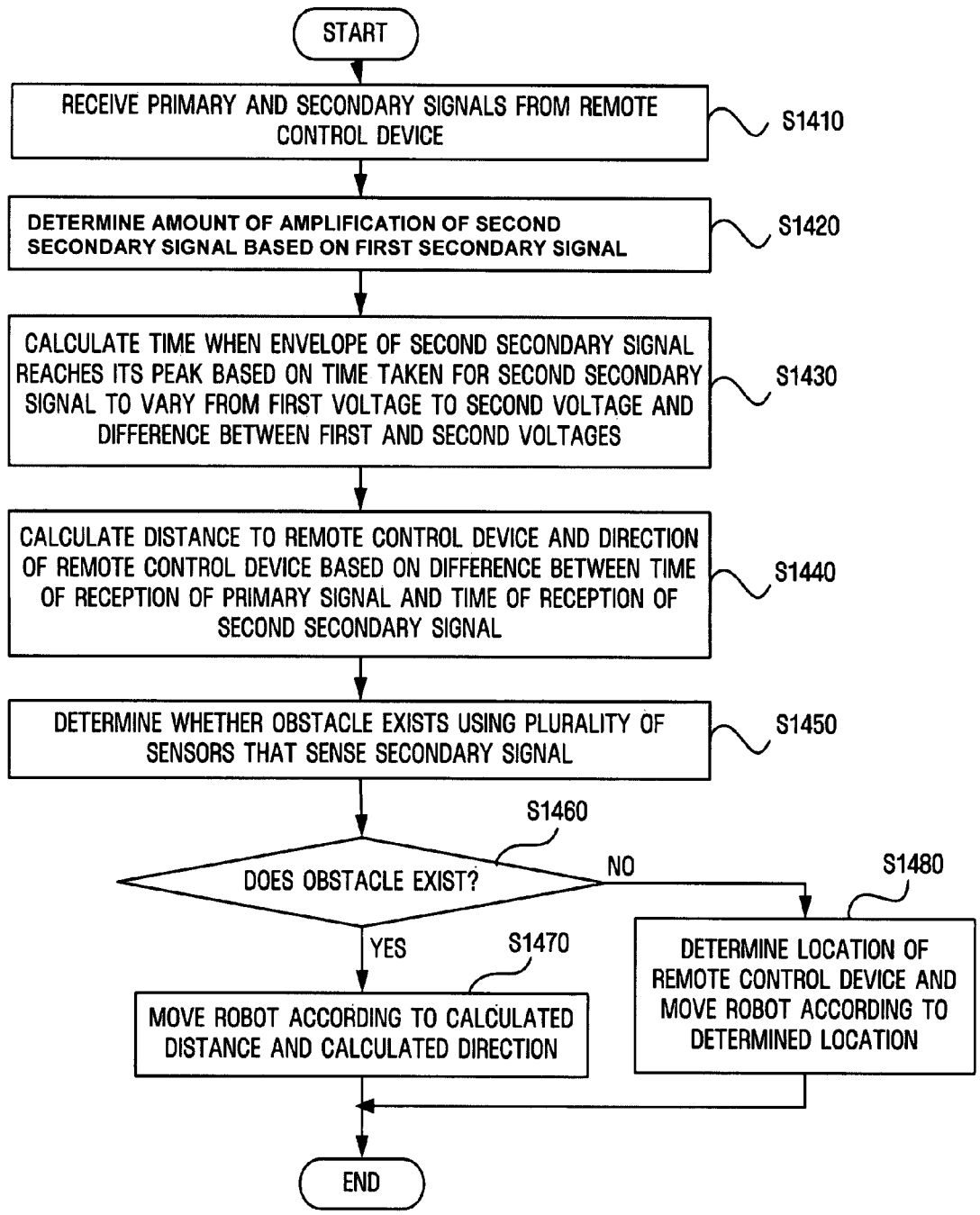
FIG. 14 is a flowchart illustrating a method of moving a robot through remote control according to an embodiment of the present invention.

FIG. 14 is a flowchart illustrating a method of moving a robot according to an embodiment of the present invention. The method illustrated in FIG. 14 involves allowing a robot to receive a signal transmitted from a signal transmitter, to determine a distance to the remote control device and the direction of the remote control device, to determine whether an obstacle exists, and to move to a desired location.

In detail, referring to FIG. 14, in operation S1410, primary and secondary signals are received from the signal transmitter. As described above, the primary signal may be a signal such as an RF/IR signal which can be received by the robot almost as soon as being transmitted by the remote control device, and the secondary signal may be a signal such as an ultrasound signal which can be received by the robot after the reception of the primary signal. The secondary signal may be transmitted at least two times by the remote control device in order to enhance the reception of the secondary signal. In operation S1420, the robot determines the amount by which the second secondary signal, i.e., a measurement signal, is to be amplified based on the first secondary signal (e.g., an AGC signal). In operation S1430, the time of reception of the second secondary signal (e.g., a measurement signal) amplified by the determined amount of amplification is detected. For example, in order to detect the time of arrival of the second secondary signal, the time when the envelope of the second secondary signal reaches its peak may be measured based on the time taken for the second secondary signal to vary from a first voltage to a second voltage and a difference between the first and second voltages.

In operation S1440, the distance between the robot and the signal transmitter and the direction are determined based on a difference between the time of reception of the primary signal and the time of reception of the second secondary signal. In operation S1450, it is determined whether an obstacle exists between the robot and the remote control device based on the determined distance obtained in operation S1440, as described above with reference to FIGS. 11 and 13. If it is determined in operation S1460 that an obstacle exists between the robot and the remote control device, the location of the remote control device is estimated or determined (S1480), and the robot moves toward the remote control device according to the results of the estimation or the determination in operation S1470. If an obstacle exists between the robot and the remote control device but there are two sensors left unblocked by the obstacle, the location of the remote control device can still be determined, and thus, the robot can move to a predetermined location, thereby avoiding the obstacle. If it is determined in operation S1460 that no obstacle exists between the robot and the remote control device, the robot moves toward the determined direction obtained in operation S1440 by the determined distance obtained in operation S1440.

Figure 15:
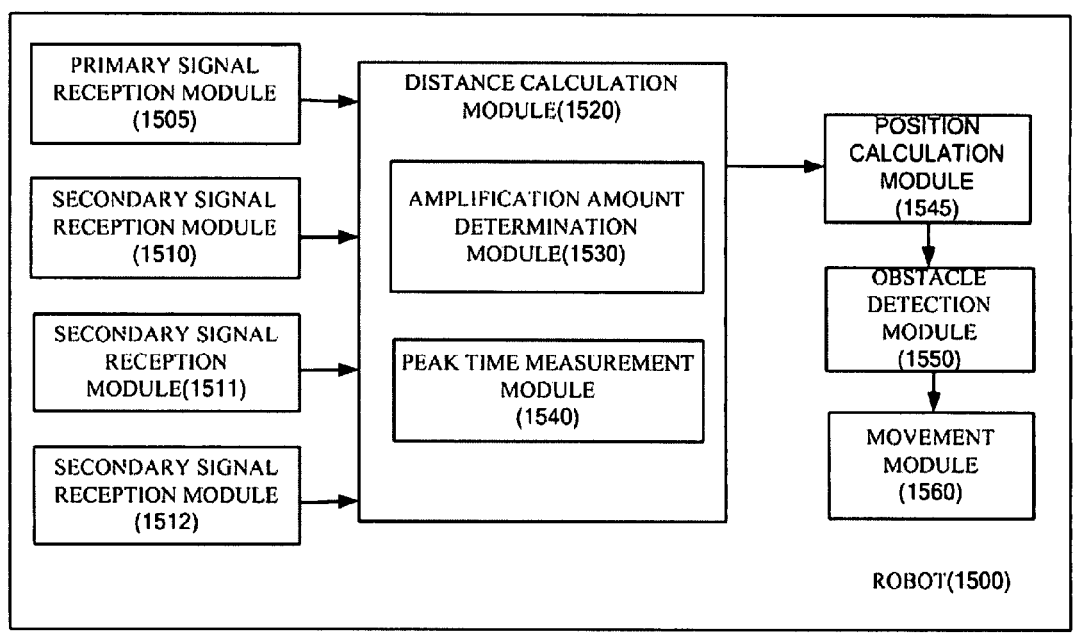
FIG. 15 is a block diagram of a robot according to an embodiment of the present invention.

FIG. 15 is a block diagram of a robot 1500 according to another embodiment of the present invention.

The term "module", as used herein, means, but is not limited to, a software or hardware component, such as a Field Programmable Gate Array (FPGA) or an Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Referring to FIG. 15, the robot 1500 includes a plurality of signal reception modules 1505, 1510, 1511, and 1512, a distance calculation module 1520, and a position calculation module 1545. The robot 1500 may further include a movement module 1560. Primary and secondary signals transmitted by a signal transmitter such as a remote control device may be received by the signal reception modules 1505, 1510, 1511, and 1512.

The distance calculation module 1520 calculates the distance between the robot 1500 and the signal transmitter based on primary and secondary signals received by the signal reception modules 1505, 1510, 1511, and 1512. An amplification amount determination module 1530 uses a first secondary signal transmitted by the remote control device to determine the amount of amplification for a secondary signal yet to be received. In detail, as described above with reference to FIG. 5, the amplification amount determination module 1530 uses level measurement results provided by a level measurement module, which measures the amplitude of the first secondary signal, to determine the amount by which the secondary signal yet to be received is to be amplified if the first secondary signal fails to satisfy a predetermined threshold condition, and feeds back and sets the determined amount of amplification.

As described above with reference to FIGS. 7 through 9, a peak time measurement module 1540 detects a time t1 when the first secondary signal reaches a first voltage and a time t2 when the first secondary signal reaches a second voltage, determines the height of an envelope of the first secondary signal based on the times t1 and t2, and detects the time when the envelope of the first secondary signal reaches its peak.

The position calculation module 1545 calculates the position of the moving robot with respect to the signal transmitter, and the position of a signal transmitter with respect to the moving robot based on the distance from each sensor, which has been calculated by the distance calculation module 1520.

A position estimation module of a moving robot disclosed in the embodiments of the present invention may include an obstacle detection module 1550, and determines whether an obstacle exists between the signal transmitter and the robot 1500. A method of determining whether an obstacle exists has already been described above with reference to FIG. 11.

The distance calculation module 1520 transmits the determined distance between the remote control device and the robot 1500 and the determined direction of the remote control device to the movement module 1560, and the movement module 1560 moves the robot 1500.

Further, the position estimation module of the moving robot disclosed in the embodiments of the present invention may further include a transmitter calculated by the position calculation module or a storage module that stores the position of the robot.

Further, the estimation module may further include a moving path pattern formation module that forms a moving path pattern of the moving robot from a plurality of signal transmitters stored in the storage module. A movement module can move the moving robot along the moving path formed by the moving path pattern formation module.

As described above, the method and apparatus for estimating a position of a moving robot using a signal generator according to the embodiments of the present invention has one or more of the following effects. According to the embodiments of the present invention, it is possible to increase signal detection ability and accuracy of estimating a robot position. According to the embodiments of the present invention, it is possible to determine an obstacle between a signal generator and a moving robot.

Although a few embodiments have been shown and described, it would be appreciated by those skilled in the art that changes may be made in these embodiments without departing from the principles and spirit of the invention, the scope of which is defined in the claims and equivalents.

What is claimed is:

1. A method of estimating a position of a moving robot, the method comprising:

receiving a primary signal and a secondary signal transmitted from a signal transmitter using a sensor that receives the primary signal and three or more sensors that receive the secondary signal, on the moving robot;

calculating transmission distances from the signal transmitter to each sensor that receives the secondary signal using time information extracted from the primary signal; and calculating a position of the signal transmitter from the calculated transmission distances;

wherein the secondary signal comprises first and second secondary signals and the sensor that senses the secondary signal determines whether to amplify the second secondary signal based on the measuring of the first secondary signal.

2. The method of claim 1, wherein the calculating of the transmission distance comprises calculating a distance from which the secondary signal has been transmitted based on information indicating a difference between a time of reception of the primary signal and a time of reception of the secondary signal.

3. The method of claim 2, further comprising transmitting the secondary signal a predetermined period of time after transmitting of the primary signal.

4. The method of claim 1, wherein the determining whether to amplify the secondary signal comprises informing the sensor that senses the secondary signal of an amount to amplify the second secondary signal if the first secondary signal is below a predetermined threshold.

5. The method of claim 1, wherein the calculating of the transmission distance comprises calculating times $t_1$ and $t_2$, calculating an envelope of the secondary signal, and using a time when the envelope of the secondary signal reaches its peak.

6. The method of claim 5, wherein the calculating of the time when the envelope of the secondary signal reaches its peak comprises calculating a ratio between a difference between the times $t_1$ and $t_2$ and a difference between first and second voltages $V_1$ and $V_2$ of the secondary signals at the times $t_1$ and $t_2$ respectively.

7. The method of claim 1, further comprising determining whether an obstacle exists between a place where the secondary signal has been transmitted and the robot if one of the sensor that receives the secondary signal fails to sense the secondary signal or if the calculated transmission distance fails to satisfy a predetermined mathematical relational expression.

8. The method of claim 7, wherein the receiving of the secondary signal comprises sensing by three of the sensors, and the determining whether to amplify the second secondary signal comprises, if the three sensors respectively determine the distances to the signal transmitter as $L_1$, $L_2$, and $L_3$ and distances between the three sensors are respectively $d_1$, $d_2$, and $d_3$, forming a triangle by using a combination of the distances $L_1$, $L_2$, $L_3$, $d_1$, $d_2$, and $d_3$; and determining that the obstacle exists between the place where the secondary signal has been transmitted and the robot based on the sum of the lengths of two sides of the triangle being greater than the length of the other side of the triangle.

9. The method of claim 1, further comprising moving the moving robot to the signal transmitter.

10. The method of claim 1, wherein the signal transmitter is a remote control.

11. The method of claim 1, wherein the primary signal is a radio frequency (RF) or an infrared (IR) signal.

12. The method of claim 1, wherein the secondary signal is an ultrasonic wave.

13. The method of claim 1, further comprising:
storing a position of the signal transmitter.

14. The method of claim 13, further comprising forming a moving path of the moving robot from the positions the signal transmitter; and
moving the robot along the moving path pattern.

15. The method of claim 14, wherein the forming the moving path comprises forming a patterns within an envelope that connects the stored positions of the signal transmitter.

16. An apparatus estimating a position of a moving robot, the apparatus comprising:
a primary signal receiver that receives a primary signal transmitted from a signal transmitter, on the moving robot;
three or more secondary signal receivers that receive a secondary signal transmitted from the signal transmitter, on the moving robot;
a distance calculation module that calculates transmission distances of the secondary signal from the signal transmitter to each the secondary signal receiver using time information extracted from the primary signal; and
a position calculation module that calculates a position of the signal transmitter according to the calculated transmission distance;
wherein the secondary signal comprises first and second secondary signals and the distance calculation module comprises an amplification amount determination module that determines whether to amplify the second secondary signal based on a measurement of the first received secondary signal.

17. The apparatus of claim 16, wherein the distance calculation module comprises a time calculation module that calculates the transmission distance using information on a difference between a reception time of the primary signal and a reception time of the secondary signal.

18. The apparatus of claim 17, wherein the secondary signal is transmitted a predetermined period of time after the transmission of the primary signal.

19. The apparatus of claim 16, wherein the distance calculation module comprises a level measurement module that determines an amplitude of the first secondary signal, and if the determined amplitude is below a predetermined threshold, the amplification amount determination module determines to amplify the second secondary signal, feeds back and sets an amount of the amplification.

20. The apparatus of claim 16, wherein the distance calculation module comprises a peak time measurement module that calculates a time when the envelope of the secondary signal reaches a peak.

21. The apparatus of claim 20, wherein the peak time measurement module calculates a ratio between a difference between times t1 and t2 and a difference between first and second voltages V1 and V2 of the secondary signals at times t1 and t2, respectively.

22. The apparatus of claim 16, further comprising:
three of the secondary signal receivers; and
an obstacle detection module that determines that an obstacle exists between the signal transmitter and the robot if one of the secondary signal receiver fails to sense the secondary signal or if the calculated transmission distance by the secondary signal receivers fails to satisfy a predetermined mathematical relational expression.

23. The apparatus of claim 22, further comprising the three of the secondary signal receivers to determine respective distances to the signal transmitter as $L_1$, $L_2$, and $L_3$, and the distances between the three secondary signal receivers respectively as $d_1$, $d_2$, and $d_3$, the obstacle detection module forms a triangle by using a combination of the distances $L_1$, $L_2$, $L_3$, $d_1$, $d_2$, and $d_3$ and determines whether an obstacle exists between the signal transmitter and the robot based on the fact that the sum of the lengths of two sides of the triangle is greater than the that of the other side of the triangle.

24. The apparatus of claim 16, further comprising a movement module that moves the moving robot to the signal transmitter.

25. The apparatus of claim 16, wherein the signal transmitter is a remote control.

26. The apparatus of claim 16, wherein the primary signal is a RF or an IR signal.

27. The apparatus of claim 16, wherein the secondary signal is an ultrasonic wave.

28. The apparatus of claim 16, further comprising a storage module that stores a position of the signal transmitter.

29. The apparatus of claim 28, further comprising:
a moving path pattern formation module that forms a moving path pattern of the moving robot from a plurality of the signal transmitters stored in the storage module; and
a movement module that moves the moving robot along the moving path pattern.

30. The apparatus of claim 29, wherein the moving path pattern is formed within an envelope that connects the positions of the plurality of the signal transmitters.

* * * * *

UNITED STATES PATENT AND TRADEMARK OFFICE
CERTIFICATE OF CORRECTION

PATENT NO. : 7,679,997 B2 Page 1 of 1
APPLICATION NO. : 11/808001
DATED : March 16, 2010
INVENTOR(S) : Dong-geon Kong et al.

It is certified that error appears in the above-identified patent and that said Letters Patent is hereby corrected as shown below:

On the Title Page, Item (75) (Inventors), Line 3, change "Youngin-si (KR);" to --Yongin-si (KR);--.

Column 13, Line 20, after "each" insert --of--.

Column 14, Line 27, after "than" delete "the".

Signed and Sealed this

Fifteenth Day of June, 2010

David J. Kappos
*Director of the United States Patent and Trademark Office*